United States Patent [19]

Dykstra

[11] Patent Number: 4,958,813

[45] Date of Patent: Sep. 25, 1990

[54] DIE CLAMP

[75] Inventor: Henry Dykstra, Milford, Mich.

[73] Assignee: Delaware Capital Formation, Inc., Wilmington, Del.

[21] Appl. No.: 413,700

[22] Filed: Sep. 28, 1989

[51] Int. Cl.[5] ....... B23Q 3/08

[52] U.S. Cl. ....... 269/32; 269/94; 269/234; 269/238

[58] Field of Search ....... 269/32, 232, 234, 229, 269/138, 238, 91–94

[56] References Cited

U.S. PATENT DOCUMENTS

| | | | |
|---|---|---|---|
| 1,536,310 | 5/1925 | Rothlisberger | 269/91 |
| 2,499,408 | 3/1950 | Nipken | 269/94 |
| 2,755,758 | 7/1956 | Johansen | 269/94 |
| 3,078,088 | 2/1963 | Einsiedler | 269/91 |
| 3,281,140 | 10/1966 | Smierciak | 269/94 |
| 3,967,817 | 7/1976 | McClocklin | 269/94 |
| 4,174,828 | 11/1979 | Bergman | 269/20 |
| 4,538,797 | 9/1985 | Lerch | 269/238 |
| 4,721,293 | 1/1988 | Schron et al. | 269/94 |

*Primary Examiner*—Robert C. Watson

*Attorney, Agent, or Firm*—Lloyd M. Forster

[57] ABSTRACT

A variable height die clamp adjustable through threaded knob on a single T-headed bolt engageable with the T-slots of conventional machine table. A clamp arm pivotally connected at the centerline of the bolt through a pair of side brackets and a bolt guide has a spaced end raised through a reaction connection of the side brackets with the machine table surface and through a transverse hydraulic piston having a flat wedge surface adapted to engage a flatted surface on a longitudinal locking pin.

12 Claims, 4 Drawing Sheets

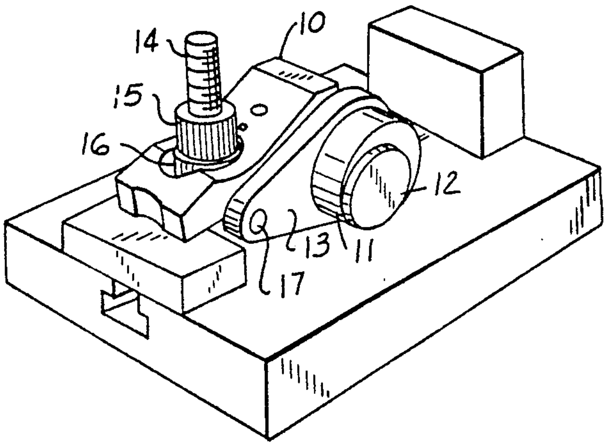
FIG.1
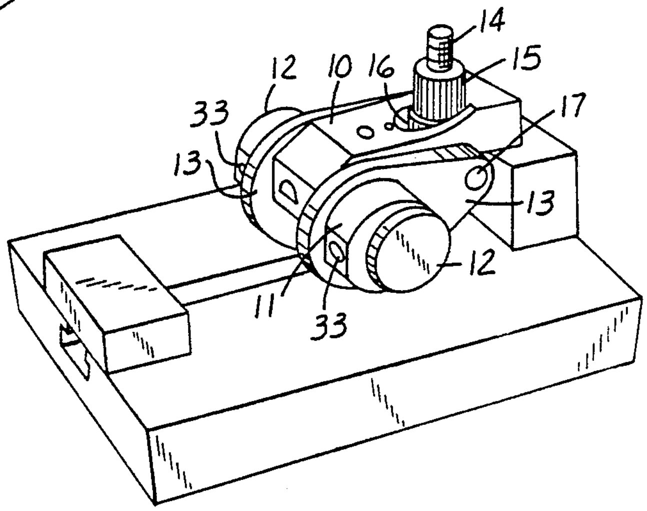
FIG.2
FIG.3
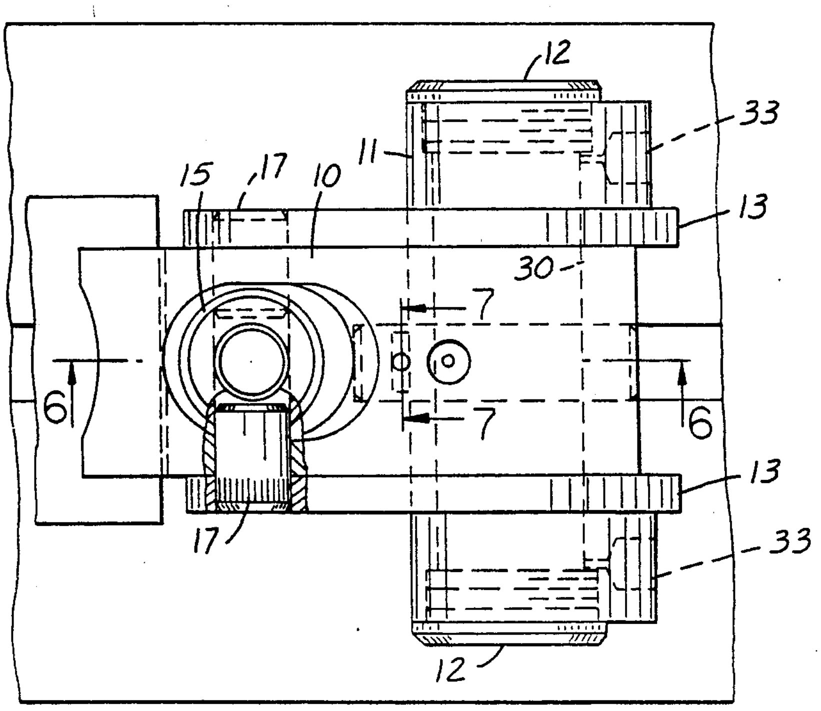
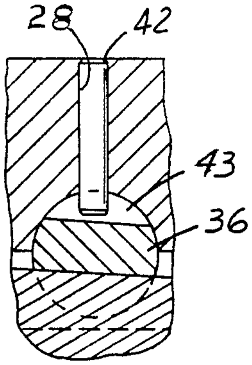
FIG.7

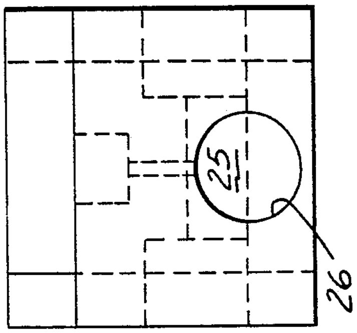
FIG. 12
FIG. 10
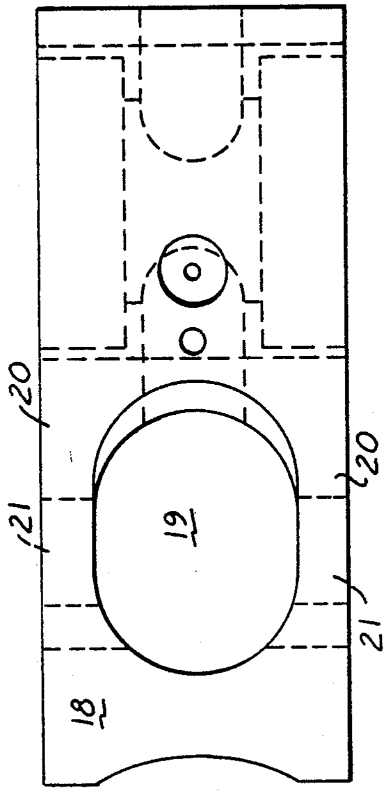
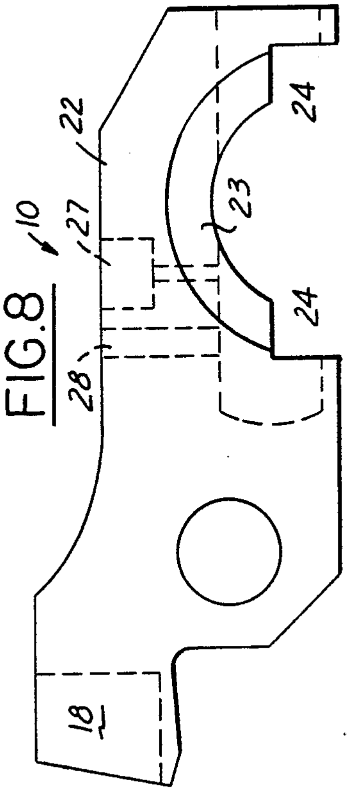
FIG. 8
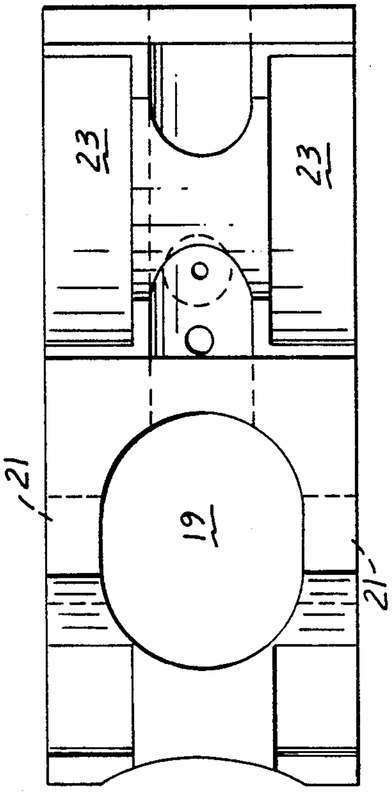
FIG. 9
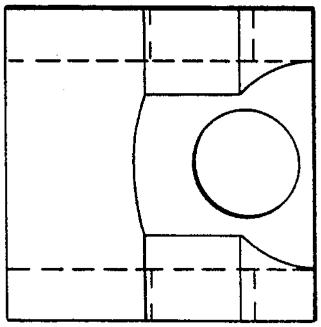
FIG. 11

DIE CLAMP

BACKGROUND OF THE INVENTION

Hydraulically actuated die clamps are employed to hold down the periphery of die plates on flat bolster plates, provided with T-slot anchorage, in order to achieve high clamping forces. Prior art clamping devices are disclosed in U.S. Pat. Nos. 4,511,127 dated Apr. 16, 1985 and 4,721,293 dated Jan. 26, 1988.

In the first, a self-locking hydraulic clamping device includes a hydraulic piston which is notched on one side to form a compound camming surface which drivingly engages a spring loaded clamping pin moving in a bore normal to the bore in which the hydraulic piston moves, the later bore preferably extending parallel to the side of the workpiece being clamped.

In the second, the device provides a double acting piston formed with a camming surface intermediate its ends. A cylindrical clamping pin is guided within the device for movement in a direction perpendicular to the camming surface and is provided with an end surface perpendicular to such direction of movement which engages the camming surface. An output lever pivotally mounted on the device engages the clamping pin at one end and is operable to engage tooling at its other end to clamp the tooling in position. The clamping pin is cylindrical and is free to rotate about its axis so as to reduce localized wear when the device is repeatedly cycled. A spring operably positioned between the lever and the body of the device resiliently biases the lever and the clamping pin toward the release position.

BRIEF DESCRIPTION OF THE PRESENT INVENTION

A die clamp adjustable for a range of vertical heights, e.g., one to two and one half inches, is provided through the use of an elongated threaded T-bolt engageable with a conventional T-slot bolster plate adapted to provide a fulcrum near the clamping head of a die clamp arm with a reaction body of the arm housing a tranverse hydraulically actuated piston. A flat piston ramp surface engages a flatted generally cylindrical locking pin to exert a clamping reaction force against the bolster plate after a T-bolt nut has been manually tightened to take up preclamping clearances. Side plates with arcuate surfaces for reaction engagement with the bolster plate surface are connected to a bolt guide with pivot pins which accommodate angular differences in the clamping arm throughout the range of adjustable clamping heights.

In a modified construction, a piston location indicator has been added to the die clamp. This serves the purpose of providing a visual confirmation that the piston is attracted from its clamping position for initial manual tightening to take up all clearance prior to hydraulic actuation of the piston for effecting final clamping.

BRIEF DESCRIPTION OF THE DRAWINGS

FIG. 1 is a perspective view of the die clamp mounted on a T-slotted plate simulating a machine table and illustrating the clamping position for a relatively miniumum die plate thickness;

FIG. 2 is a similar perspective view illustrating the die clamp engagement for a relatively thicker tool plate;

FIG. 3 is a plan view of the die clamp;

FIG. 7 is a sectional view taken along the line 7—7 of FIG. 3;

FIGS. 8-12 are respectively side elevation, plan, bottom, left-end, and right-end views of the die clamp arm per se;

DETAILED DESCRIPTION OF A PREFERRED EMBODIMENT

Figure 4:
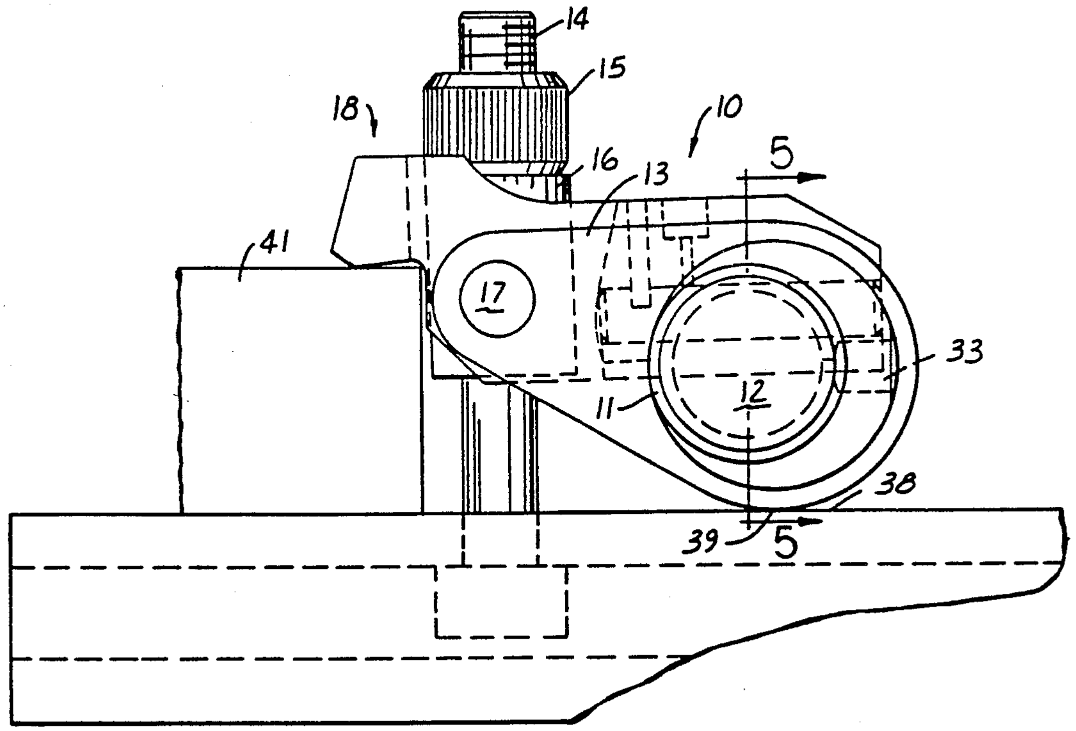
FIG. 4 is a side elevation of the die clamp illustrating clamping engagement of a relatively thick tool plate.
Figure 5:
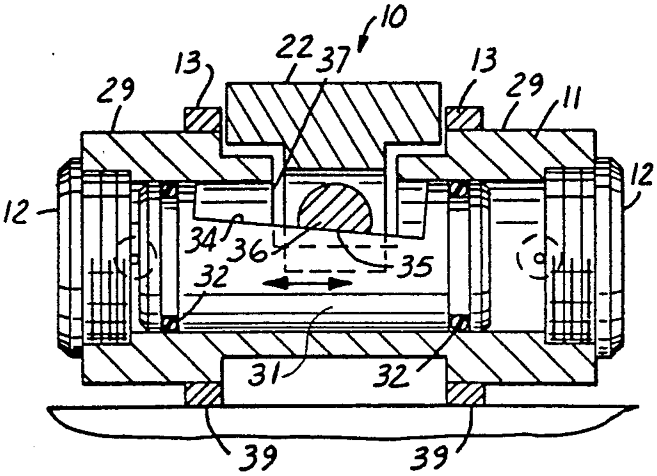
FIG. 5 is a sectional view taken along the line 5—5 of FIG. 4.

With reference to FIGS. 1 and 2, the die clamp comprises clamp arm 10, transverse cylinder 11 having end caps 12, side brackets 13, T-bolt 14 with threaded knob 15, bolt guide 16, pivot pins 17, and internal elements illustrated in the other figures.

With reference to FIGS. 8-12, clamp arm 10 is provided with workpiece engagement clamping nose 18, through oval slot 19, sides 20 including pivot bearing holes 21, rigid arm back 22 having transverse cylinder recesses 23 with terminal shoulder corners 24, longitudinal cylindrical bore 25 having locking pin bearing surface 26, lubrication passage 27 and retainer pin hole 28.

With reference to FIGS. 3-7, cylinder 11 is provided with annular ends 29 mounted within side brackets 13 which are pivotally connected at 17 to pin bearings 21 in either side of arm 10. Cylinder bore 30 eccentrically located in cylinder 11 is provided with piston 31 sealed by O-rings at 32 from hydraulic actuating fluid admitted to either end through ports 33. The upper side of piston 31 is provided with flat ramp surface 34 for engaging flatted surface 35 of generally cylindrical longitudinal locking pin 36, the innerengagement whereof is accommodated by slotted opening 37 intersecting and extending across the bore 30 of cylinder 11.

Bolt guide 16 is pivotally connected by pins 17 to side brackets 13 and through engagement of knob 15 provides a fulcrum reaction for clamp arm 10 when piston 31 is hydraulically actuated to raise locking pin 36 forcing cylinder 11 and side brackets 13 into downward pressure engagement with T-slotted bolster plate 38. Arcuate engaging surfaces 39 of side brackets 13 accommodate any change of clamping arm angle involved in the range of adjustment between maximum height, as illustrated, to a minimum height with bracket surfaces 40 nearly parallel to the T-slotted table surfaces.

As mentioned above, with clamp head 18 engaging die plate 41, all clearances are taken up by initially manually tightening knob 15 against bolt guide 16. This minimizes the stroke of locking pin 36 necessary exert full clamping pressure and permits a self-locking ramp angle in the order of 4.5° to 7.5° to provide a corresponding high mechanical advantage in the wedge action resulting from piston actuation.

Figure 6:
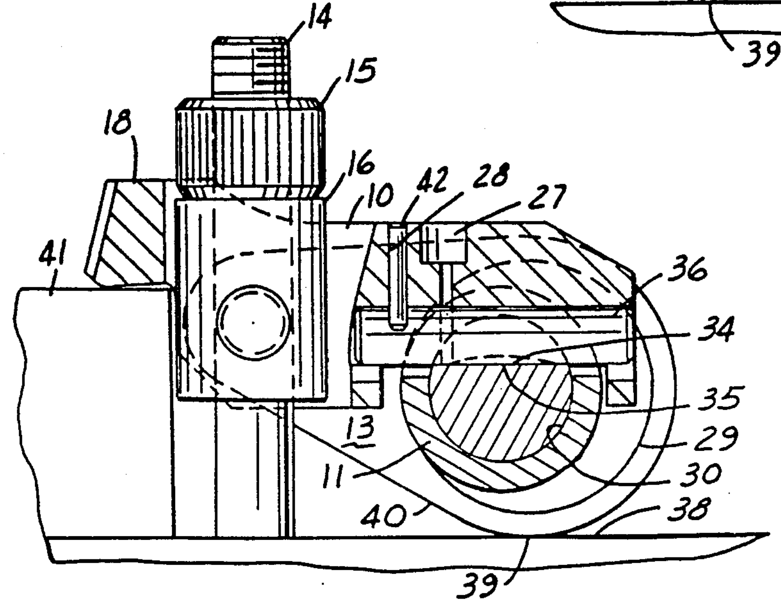
FIG. 6 is a sectional view taken along the line 6—6 of FIG. 3.

It will be understood that the geometry of piston ramp surface, flatted locking pin and its cylindrical bearing provide for a true area pressure engagement of the actuating surfaces involved throughout the entire range of adjustment in clamp height, during which the piston can rotate angularly within its bore in order to maintain area contact with locking pin 36, as shown in FIGS. 3, 6 and 7. Pin 42 engages slot 43 in locking pin 36 to retain its longitudinal position. Lubrication of the sliding surfaces is provided through lube passage 27.

From the foregoing it will be seen that a versatile adjustable die clamp has been provided which may be readily positioned on any T-slotted machine table surface in order to rigidly clamp die plates or other tool or workpieces of variable height within a substantial clamping range wherein any adjustment is readily effected through manual tightening of a single T-bolt knob.

Figure 13:
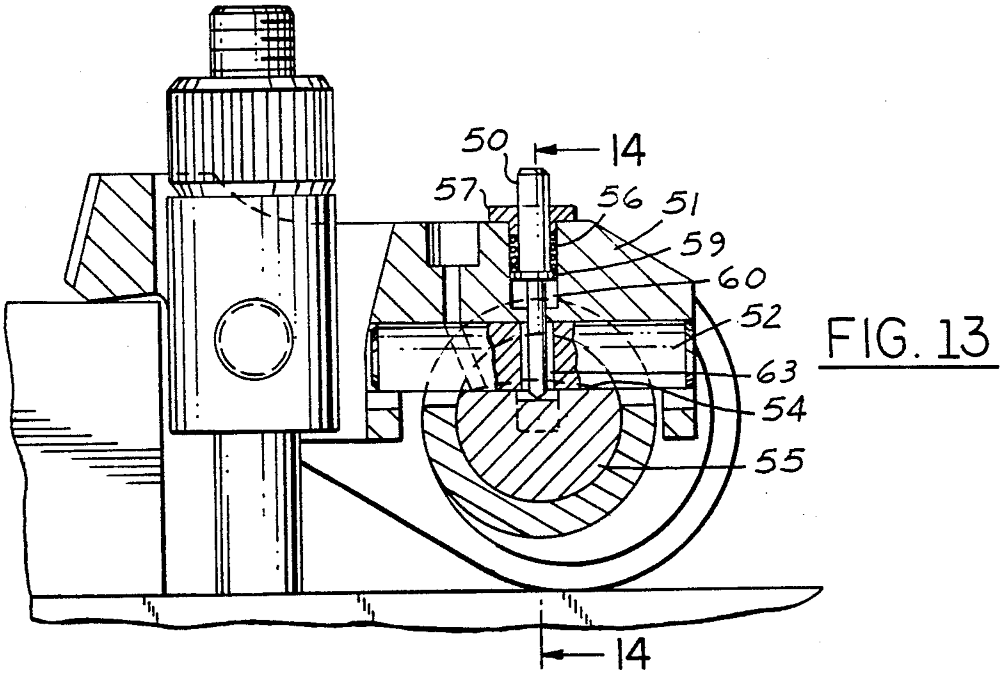
FIG. 13 is a view similar to FIG. 6 illustrating a modified construction.
Figure 14:
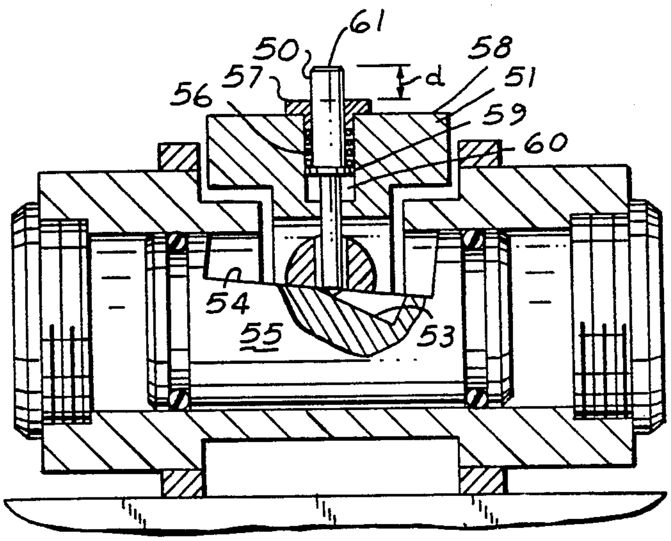
FIG. 14 is a sectional view taken along the line 14—14 of FIG. 13.
Figure 15:
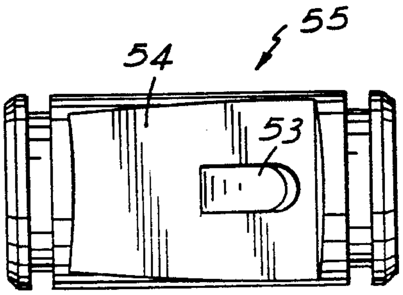
FIG. 15 is a plan view of the modified piston per se illustrated in FIGS. 13 and 14.

With reference to FIGS. 13–15, the preferred modified construction includes indicator pin 50 projecting through modified clamp arm 51 and modified locking pin 52 engaging slotted ramp surface 53 depending from flat ramp surface 54 of modified piston 55. Compression spring 56 reacting between bushing 57 fixed at upper surface 58 of clamp arm 51 and pin shoulder 59 slidable within bore 60 in the top of clamp arm 51 urges pin 50 into engagement with ramp surface 53.

Upon hydraulic actuation of piston 55 in a clamping direction, to the right as shown in FIG. 14, indicator pin 50 will rise to the solid line position shown with its top end 61 above the top surface of bushing 57 visibly indicating that piston 55 has been displaced toward clamping position. At the left hand extremity of piston 54, the top end 61 will drop by distance "d" shown in FIG. 14, to a flush relation with the top surface of bushing 57 as required for initial manual setting of the clamp arm.

Accordingly, it is important, prior to manual take up of clearance and preliminary manual tightening of reaction nut 15 as shown in the first embodiment, to verify flush position of indicator pin 50, thereby assuring the availability of the full stroke of piston 55 to effect hydraulic clamping actuation of locking pin 52. In the event that the die clamp is initially delivered, or placed in operation, with piston 55 displaced from its pre-clamping extremity projection of indicator pin 50 above the flush position shown at 61 will remind the operator to hydraulically actuate piston 55 to its proper pre-clamping position.

Indicator pin 50 will also serve the purpose of pin 42 of the first embodiment in longitudinally retaining locking pin 52 in its operative position with adequate clearance in passage 63 through locking pin 52 to accommodate any angular displacement of the locking pin in maintaining its area contact with flatted surface 54 of piston 55 throughout all operative clamping positions.

I claim:

1. Power clamp for mounting on T-slotted support surface comprising clamp arm with clamping end, intermediate adjustable T-bolt fulcrum means for anchoring said clamp arm to said support surface at adjustable clamping levels, and hydraulic cylinder fluid power actuated piston with ramp surface means for reacting against said support surface to raise the other arm end and thereby effect clamping engagement with a member interposed between said clamping end and said support surface, including locking pin extending longitudinally of said clamp arm interposed between said other arm end and said piston.

2. Power clamp of claim 1 including interengaging arcuate arm and locking pin reaction surface and interengaging flat ramp and locking pin engagement surfaces for maintaining interengaging area contact actuating surfaces upon hydraulic piston actuation.

3. Power clamp of claim 2 including T-bolt guide means interconnected with said clamp arm to provide pivotal reaction therebetween throughout the adjustable range of said T-bolt fulcrum means.

4. Power clamp of claim 3 including a through-slot in said clamp arm for said T-bolt and guide means, and cylindrical pivot pins connecting said guide means and clamp arm.

5. Power clamp of claim 4 including side bracket means for retaining said pivot pins and hydraulic cylinder and for contacting said support surface.

6. Power clamp of claim 5 including an arcuate support surface contact surface on each side bracket means for accommodating an adjustable bracket angle resulting from said adjustable clamping levels.

7. Power clamp of claim 2 including indicator pin means projecting from the exposed surface of said clamp arm through said arm and locking pin and into registration with said piston, the surface of said piston engaged by said indicator pin having a ramp angle relative to the axis of said piston whereby the exposed end of said pin will indicate the relative longitudinal position of said piston.

8. Power clamp of claim 7 including resilient means for urging said pin into registration into said piston yieldable upon longitudinal displacement of said piston.

9. Power clamp of claim 8 including a supplemental ramp slot depending from said flat ramp at an increased angle in order to amplify the displacement of said indicator pin in response to piston displacement.

10. Power clamp of claim 9 including a fixed gauge surface at the exposed end of said indicator pin to facilitate confirmation of an extremity position of said piston preparatory to manual setting of the clamp arm into clamping proximity with the workpiece.

11. Power clamp of claim 10 including a clearance passage through said locking pin adequate to accommodate any angular displacement involved in maintaining area contact between said interconnecting flat ramp and locking pin engagement surfaces.

12. Power clamp of claim 11 including fixed bushing and pin shoulder reaction surfaces engaged by a compression spring for providing said resilient means.

* * * * *